United States Patent [19]
Kang et al.

[11] Patent Number: 5,543,981
[45] Date of Patent: Aug. 6, 1996

[54] CASSETTE HOUSING FOR MAGNETIC RECORDING AND REPRODUCING APPARATUS AND METHOD FOR MANUFACTURING THE SAME

[75] Inventors: Myung G. Kang, Seoul; Seong S. Kang; Sung H. Choi, both of Kyungki-Do; Mun C. Joung, Seoul; Byoung G. Jang, Kyungki-Do; Kye Y. Ryu, Seoul; Hyo C. Yu, Seoul; Sang J. Lee, Kyungki-Do, all of Rep. of Korea

[73] Assignee: Goldstar Co., LTD., Seoul, Rep. of Korea

[21] Appl. No.: 393,030

[22] Filed: Feb. 23, 1995

Related U.S. Application Data

[63] Continuation of Ser. No. 76,149, Jun. 14, 1993, abandoned.

[30] Foreign Application Priority Data

Jun. 20, 1992 [KR] Rep. of Korea ............... 10783/1992

[51] Int. Cl.$^6$ ............................................. G11B 15/00
[52] U.S. Cl. ............................................. 360/96.6
[58] Field of Search .................. 360/96.6, 96.5, 360/99.06, 99.02, 96.5, 96.6; 369/75.1, 75.2

[56] References Cited

U.S. PATENT DOCUMENTS

| | | | |
|---|---|---|---|
| 4,704,651 | 11/1987 | Nagaya et al. | 360/96.6 |
| 5,124,854 | 6/1992 | Iyota et al. | 360/96.6 |

FOREIGN PATENT DOCUMENTS

| | | | |
|---|---|---|---|
| 1162268 | 6/1989 | Japan | 360/96.6 |
| 1319161 | 12/1989 | Japan | 360/96.6 |
| 1320665 | 12/1989 | Japan | 360/96.6 |

*Primary Examiner*—John H. Wolff
*Assistant Examiner*—Allen Cao
*Attorney, Agent, or Firm*—Birch, Stewart, Kolasch & Birch, LLP

[57] ABSTRACT

A pivotable cassette housing for a magnetic recording and reproducing apparatus, comprising a pivotable bracket formed of a single metal plate, to have an integral construction, and a cassette holder mounted in the bracket and adapted to receive a tape cassette therein. The pivotable bracket has a pair of side walls and a pair of connecting portions integrally formed with the side walls and adapted to connect the side walls with each other, one of the connecting members having a cross section with a stepped shape and the other having a cross section with a shape having opposite protruded ends. Each of the side walls has a guide pin extending inwardly from an inner surface of the side wall and the cassette holder has a guide slot for receiving the guide pin, to mount the cassette holder in the bracket. The bracket is formed by blanking a single metal plate into a construction having a pair of side wall portions, a pair of connecting portions for connecting the side walls with each other, bending the side wall portions of the construction into a shape corresponding the side walls of the bracket, and forming a plurality of recesses at the resultant bent edges of the side wall portions, to produce a plurality of reinforcing support lugs at the bent edges.

3 Claims, 8 Drawing Sheets

CASSETTE HOUSING FOR MAGNETIC RECORDING AND REPRODUCING APPARATUS AND METHOD FOR MANUFACTURING THE SAME

This application is a continuation of application Ser. No. 08/076,149 filed on Jun. 14, 1993, now abandoned.

BACKGROUND OF THE INVENTION

1. Field of the Invention

The present invention relates to a cassette housing for a magnetic recording and reproducing apparatus and a method for manufacturing the same, and more particularly to a pivotable cassette housing including a pivotable bracket in a magnetic recording and reproducing apparatus and a method for manufacturing the same.

2. Description of the Prior Art

Referring to FIGS. 10A and 10B, there is illustrated a conventional pivotable cassette housing for a camcorder employing a slide loading system, which comprises a cassette holder and a pivotable bracket.

The bracket, which is denoted by the reference numeral 50, is of a rectangular construction comprising a pair of side wall members 51 and a pair of connecting members 52 and 53 for connecting the side wall members 51 with each other. The connecting member 52 has a plate shape, whereas the connecting member 53 has a rod shape. In the bracket 50, the cassette holder for receiving a tape cassette is mounted. The cassette housing 50 is pivotally mounted at one end thereof to a base plate of a deck. Above the base plate, a slide base is arranged, which is adapted to feed a tape supplied from the tape cassette to a head drum in the deck.

Now, operation of the cassette housing with the above-mentioned construction will be described.

When the cassette housing is positioned at its opened position, the tape cassette is inserted into a space defined between the bracket and the cassette holder. As the cassette housing in which the tape cassette has been received is positioned at its closed position, by pushing it down, using the user's fingers, a lock lever mounted to the cassette housing is engaged with a lock pin attached to the base plate. At this time, the slide base moves toward the head drum so that the tape supplied from the tape cassette is fed to a desired position.

On the other hand, when the tape cassette is to be ejected from the cassette housing after all mode operations in the deck are completed, the slide base is retracted from the head drum. Thereafter, the lock lever is disengaged from the lock pin, by an operation of an eject switch. When the lock lever is disengaged from the lock pin, the cassette housing pivots by a force of a spring mounted to a pivot pin for the cassette housing and returns to its opened position enabling the ejection of the tape cassette.

The bracket 50 may be constructed by a single plate member. However, since the bracket 50 should have a thin construction, it has been conventionally constructed by several separate members such as the side wall members 51, the connecting plate 52 and the connecting rod 53.

The side wall members 51 of bracket 50 are formed by pressing a metal thin plate. The connecting plate 52 and connecting rod 53 are formed by using a material thicker than the metal plate of side wall members 51. After preparing the constituting elements of bracket 50, as mentioned above, the side wall members 51 are connected with each other, by using the connecting plate 52 and the connecting rod 53, so as to produce the bracket 50. The connecting rod 53 is positioned above the head drum at the closed position of the cassette housing. Accordingly, the connecting rod 53 is mounted so that it is positioned at a level higher than that of the connecting plate 52, so as not to come into contact with the head drum when the cassette housing is closed.

In the prior art, since the constituting elements are individually formed and assembled together to construct the bracket, the overall processes for fabricating the bracket become complex. As a result, there are disadvantage of a decrease in productivity and an increase in manufacture cost.

Furthermore, the total height of deck is large, due to the requirement that the connecting rod 53 is positioned at a level higher than that of the connecting plate 52, so as not to come into contact with the head drum when the cassette housing is closed. As a result, it is impossible to achieve a compactness of deck.

SUMMARY OF THE INVENTION

Therefore, an object of the invention is to provide a pivotable cassette housing capable of being fabricated by use of a simple process, and a method for manufacturing the same.

Another object of the invention is to provide a cassette housing including a pivotable bracket capable of being formed of a single metal plate, and a method for manufacturing the same.

Another object of the invention is to provide a pivotable cassette housing capable of reducing the weight and volume of a magnetic recording and reproducing apparatus, and a method for manufacturing the same.

Another object of the invention is to provide a pivotable cassette housing capable of reducing the manufacture cost of a magnetic recording and reproducing apparatus, and a method for manufacturing the same.

Still another object of the invention is to provide a pivotable bracket being formed of a single metal plate, but having a sufficient strength, and a method for manufacturing the same, In accordance with one aspect, the present invention provides a pivotable cassette housing for a magnetic recording and reproducing apparatus, comprising: a pivotable bracket formed of a single metal plate, to have an integral construction, and pivotally connected at one end thereof to support members attached to an upper surface of a fixed base plate provided at the apparatus; and a cassette holder mounted in the bracket and adapted to receive a tape cassette therein.

In accordance with another aspect, the present invention also provides a method for forming a bracket with an integral construction from a single metal plate, the bracket including a pair of side walls, comprising the steps of: blanking the metal plate into a construction having a pair of side wall portions, a pair of connecting portions for connecting the side walls with each other, and a pair of connecting ends adapted to be connected to a fixed base plate; bending the side wall portions of the construction into a shape corresponding to the side walls of the bracket; and forming a plurality of recesses at the resultant bent edges of the side wall portions, to produce a plurality of reinforcing support lugs at the bent edges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
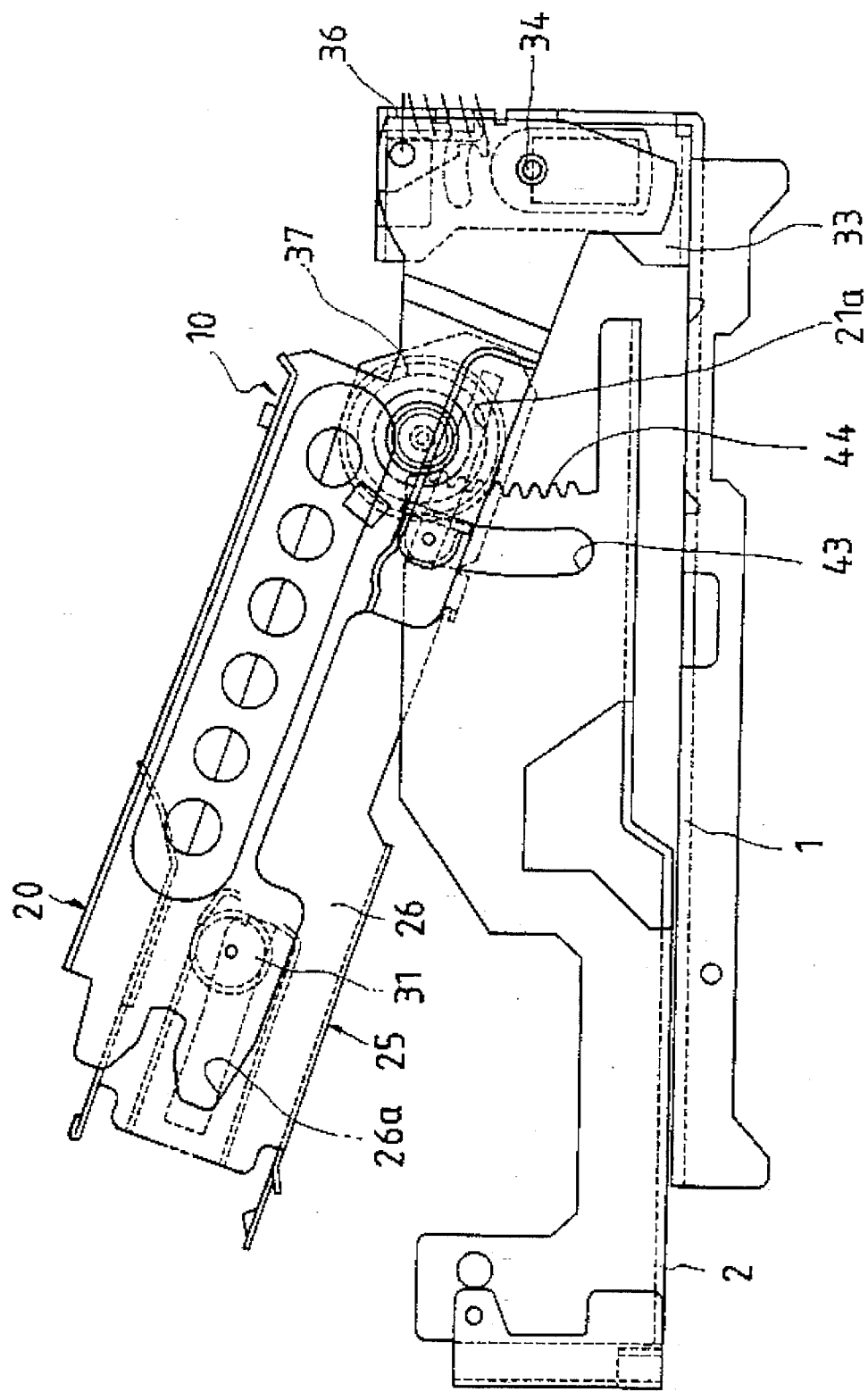
FIG. 1 is a right side view of a cassette housing for a magnetic recording and reproducing apparatus in accordance with the present invention, showing a state that the cassette housing is positioned at its opened position where a tape cassette can be inserted into or ejected from a cassette holder which constitutes a part of the cassette housing.
Figure 2:
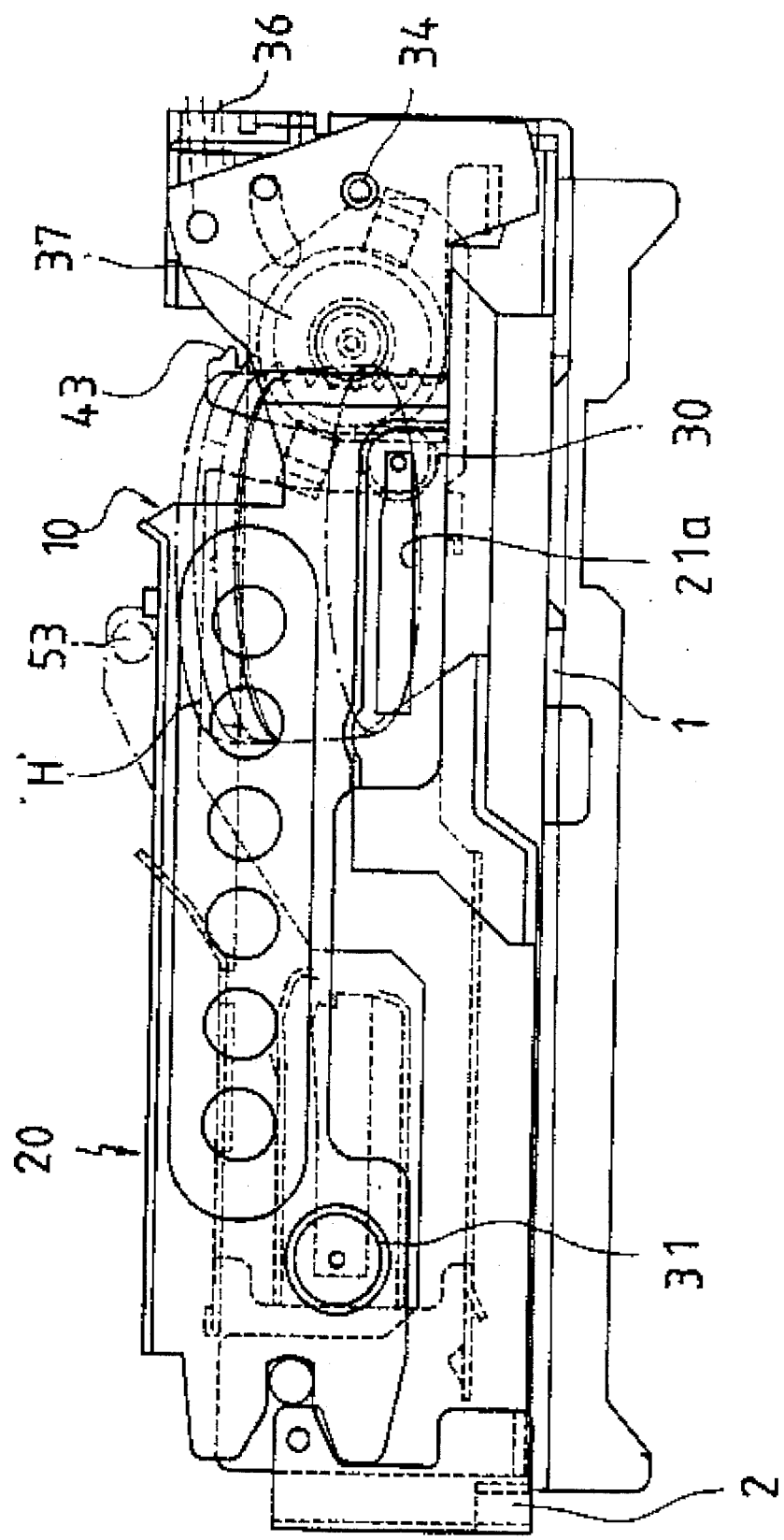
FIG. 2 is a right side view similar to FIG. 1, but showing a state that the cassette housing is positioned at its closed position.
Figure 3:
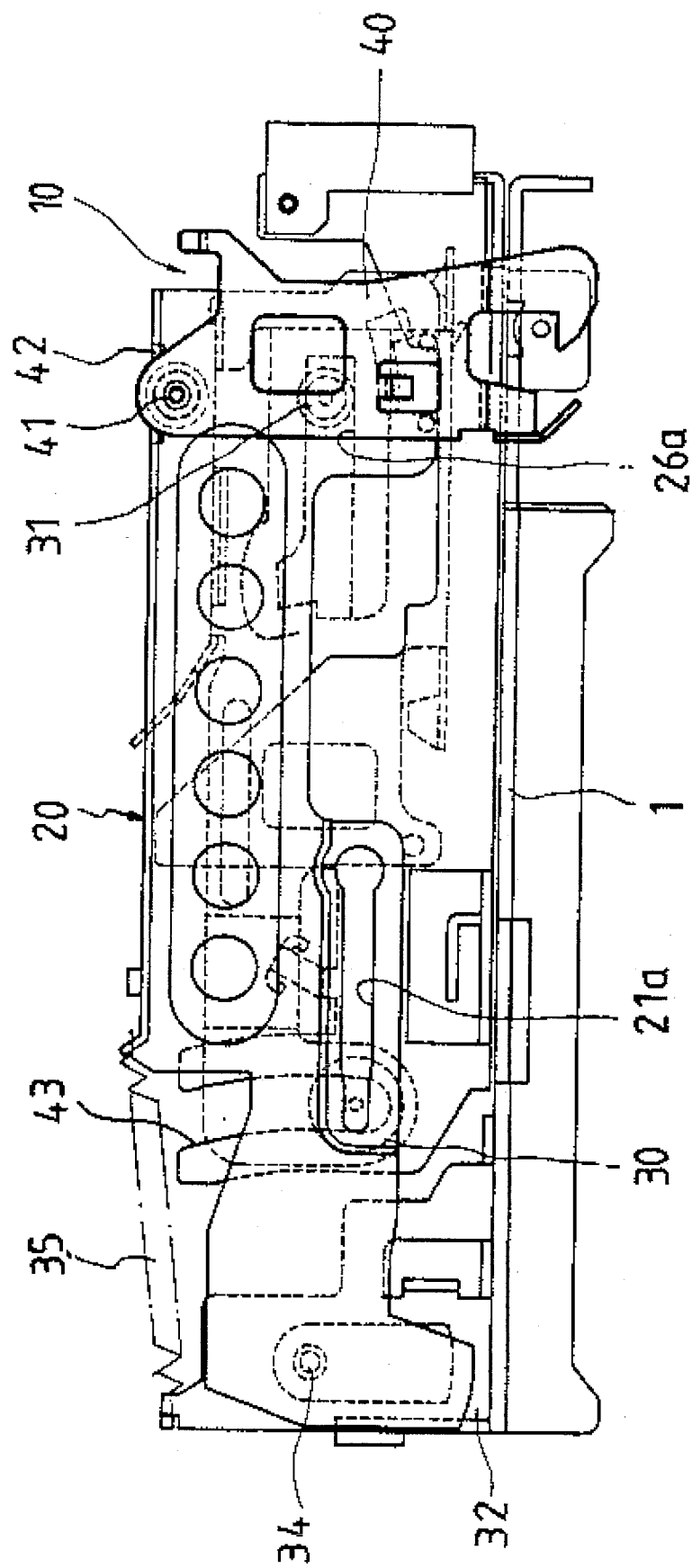
FIG. 3 is a left side view of the cassette housing positioned at its closed state.
Figure 4:
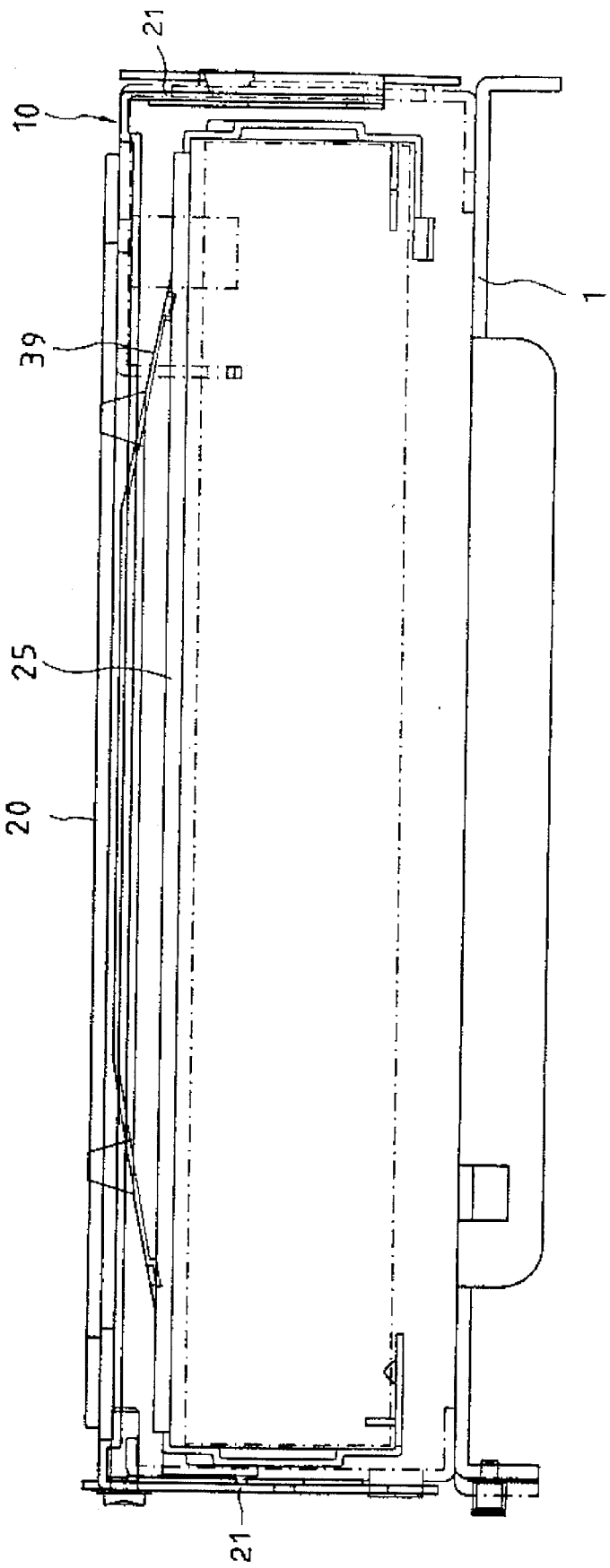
FIG. 4 is a front view of the cassette housing.
Figure 5:
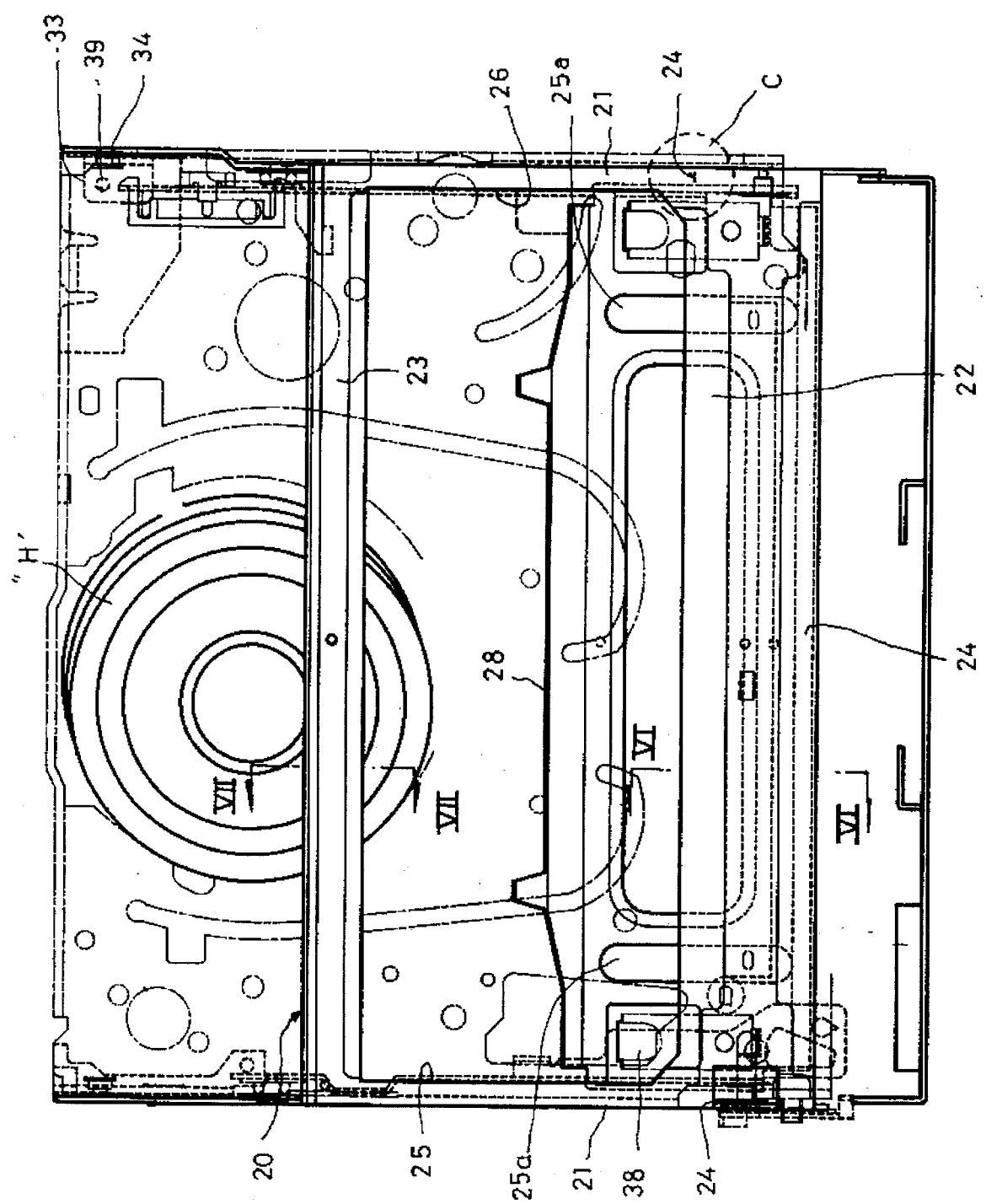
FIG. 5 is a plan view showing the overall construction of a deck in which the cassette housing of the present invention is employed.

FIG. 1 is a right side view of a cassette housing for a magnetic recording and reproducing apparatus in accordance with the present invention, showing a state that the cassette housing is positioned at its opened position where a tape cassette (not shown) can be inserted into or ejected from a cassette holder which constitutes a part of the cassette housing. FIG. 2 is a right side view similar to FIG. 1, but showing a state that the cassette housing is positioned at its closed position under a condition that the tape cassette is received or not received in the cassette holder. FIG. 3 is a left side view of the cassette housing positioned at its closed state. FIG. 4 is a front view of the cassette housing. FIG. 5 is a plan view showing the overall construction of a deck in which the cassette housing of the present invention is employed. In the drawings, the cassette housing is denoted by the reference numeral 10.

As shown in FIGS. 1 to 5, the cassette housing 10 comprises a pivotable bracket 20 capable of being formed of a single metal plate and a cassette holder 25 mounted to the lower end of the pivotable bracket 20, to be disposed inwardly of the cassette holder 25. In the cassette holder 25, a tape cassette can be received.

In accordance with the present invention, the pivotable bracket 20 is formed by pressing a single metal plate, to have a construction including, a pair of side walls 21 and a pair of connecting portions 22 and 23. In forming the bracket 20, first, the single metal plate is subjected to a blanking work, to obtain a desired construction. The obtained construction is then subjected to a bending work so that its portions to be formed as the side walls 21 are bent. Thus, the pivotable bracket 20 including the side walls 21 and connecting portions 22 and 23 is produced. In the pivotable bracket 20, the side walls 21 and connecting portions 22 and 23 are integrally formed together.

Figure 8:
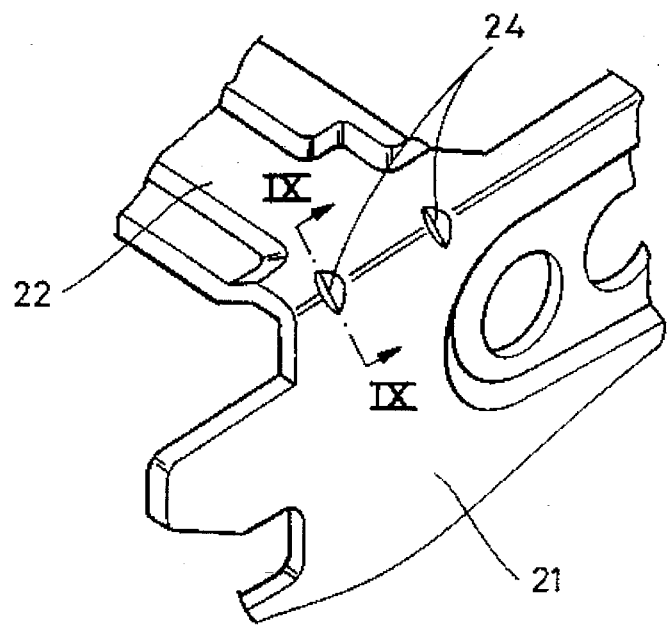
FIG. 8 is an enlarged view of a part C of FIG. 5.
Figure 9:
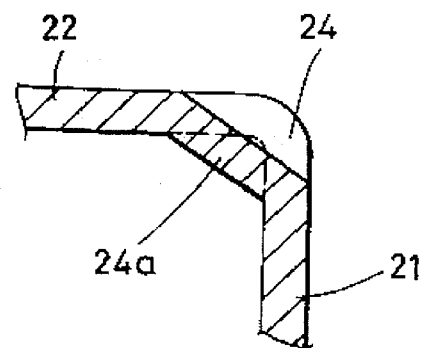
FIG. 9 is a cross-sectional view taken along the line D—D of FIG. 8.
Figure 10:
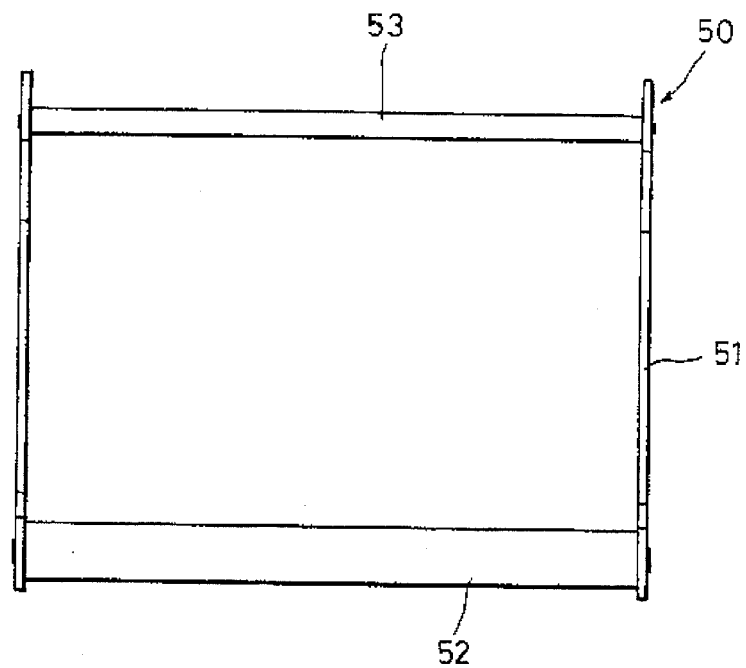
FIGS. 10A and 10B are a front view and a side view of a pivotable bracket of a conventional pivotable cassette housing, respectively.
Figure 10:
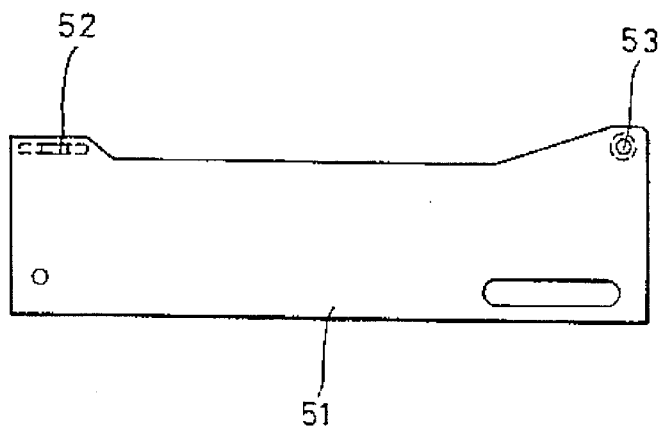

The bracket 20 with the above-mentioned construction has a uniform thickness at all its portions, namely, at the side walls and connecting portions 22 and 23. Such a uniform thickness may cause a degradation in strength at particular portions of the bracket 20. For reinforcing the strength, a plurality of recesses 24 are formed at upper surfaces of junctions where the side walls 21 are connected with the connecting portions 22 and 23, as shown in FIGS. 8 and 9. The junctions are bent edges of side walls 21. By the formation of recesses 24, reinforcing support lugs 24a are protruded from the lower surfaces of bent edges of side walls 21. The reinforcing support lugs serve to reinforce the strength of bracket 20, The formation of recesses 24 can be achieved by using a pressing work or a hammering work.

Figure 6:
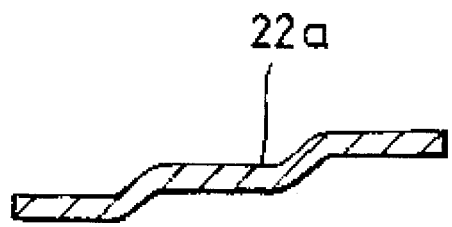
FIG. 6 is a cross-sectional view taken along the line A—A of FIG. 5.
Figure 7:
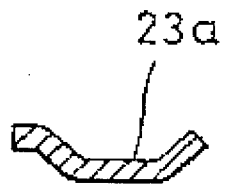
FIG. 7 is a cross-sectional view taken along the line B—B of FIG. 5.

In accordance with the present invention, the connecting portions 22 and 23 which connect the side walls 21 with each other are formed to have cross sections shown in FIGS. 6 and 7, respectively, so as to be reinforced. The connecting portion 23 to be disposed adjacent to a head drum H has a cross section 23a shaped such that opposite lateral portions thereof are upwardly protruded, as compared with the central portion thereof. The connecting portion 22 to be disposed adjacent to a cassette insertion opening has a cross section 22a having a stepped construction.

As the pivotal bracket 20 is formed by pressing a single metal plate, to make its side walls 21 and connecting portions 22 and 23 integral together, no process for assembling the constituting elements of pivotal bracket 20 is required. Moreover, the number of constituting elements is reduced, correspondingly to the elimination of the assembling process. Accordingly, it is possible to improve the productivity and to reduce the manufacture cost.

In the pivotal bracket 20, the cassette holder 25 which has opposite side wall portions 26 is pivotally mounted between the side walls 21. A plate spring 39 is also mounted to the lower surface of connecting portion 22. The plate spring 39 serves to urge the cassette holder 25 toward a slide base which is denoted by the reference numeral 2. For the mounting of the cassette holder 25, the side walls 21 have guide pins 30 and 31 extending inwardly, respectively. Also, the cassette holder 25 has guide slots 21a and 26a formed at its side wall portions 26, respectively. As the guide pins 30 and 31 of the bracket 20 are inserted into the guide slots 21a and 26a of the cassette holer 25, the bracket 20 can be mounted between the side walls 21 of bracket 20. A pair of plate springs 38 are also disposed outwardly of contact portions 25a where the cassette holder 25 is in contact with the plate spring 39 mounted to the lower surface of the connecting portion 22 of bracket 20, as shown in FIG. 5. The plate springs 38 serve to urge the tape cassette received in the cassette holder 25, toward the slide base 2.

For mounting pivotally the cassette housing 10 to the deck, the bracket 20 has a pair of axial pins 34 fixedly mounted to opposite side portions of its one end, respectively. The axial Spins 34 are rotatably coupled to a pair of support members 32 and 33 which are fixedly mounted to the upper surface of a fixed base plate denoted by the reference numeral 1, by means of screws, respectively. The support members 32 and 33 are connected with one end of the bracket 20, by means of tension springs 35 and torsion springs 36.

As shown in FIG. 3, a lock lever 40 is pivotally mounted to the left side wall 21 Of bracket 20. The lock lever 40 is engaged with a lock pin provided at the fixed base plate 1 when the cassette housing 10 is positioned at its closed position, thereby enabling the cassette housing 10 to be locked at its closed position.

When a tape cassette is inserted into the cassette housing 10 pivotally mounted to the fixed base plate 1 through the cassette inserting opening and then the cassette housing 10 is pivotally moved to its closed position, the lock lever 40 is engaged with the lock pin fixed to the fixed base plate 1, so that a cassette loading is achieved. The cassette loading is sensed by a sensing device which, in turn, actuates a loading motor (not shown). By the driving of the loading motor, the cassette holder 25 moves toward the head drum H, together with the slide base 2. At this time, the movement of cassette holder 25 is guided by the guide pins 30 and 31 provided at the side walls 21 of bracket 20 and guide slots 21a and 26a provided at the side wall portions of cassette holder 25. Thus, the cassette holder 25 guides the tape to be loaded at a desired position, so as to achieve an operation in a desired mode.

In the drawings, the reference numeral 37 denotes a damper, 43 arc slots, and 44 a sector gear engaged with a gear portion of the damper 37, As apparent from the above description, the present invention provides a cassette housing for a magnetic recording and reproducing apparatus, capable of being contributed to a lightness and a compactness of camcorders. As the cassette housing includes a pivotal bracket formed by pressing a single metal plate, no process for assembling constituting elements of pivotal bracket is required. Moreover, the number of constituting elements is reduced, correspondingly to the elimination of the assembling process. Accordingly, it is possible to simplify the process for assembling the cassette housing. Since the bracket and the cassette holder both constituting the cassette housing are thin and light, it is also possible to reduce the weight and the height of the magnetic recording and reproducing apparatus such as a camcorder. The reduced number of constituting elements and the simplified assembling process makes it possible to reduce the manufacture cost and decrease the overall weight and volume of camcorder. Thus, a compactness of camcorder can be achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A pivotable cassette housing for a magnetic recording and reproducing apparatus having a fixed base plate having a pair of support members attached to an upper surface thereof, said pivotable cassette housing comprising:

a pivotable bracket formed of a single metal plate and including a pair of side walls and a first and a second connecting member for connecting said side walls with each other, said first connecting member having a stepped shape cross section having a first step portion, a second step portion adjacent to said first step portion, and a third step portion adjacent to said second step portion wherein each of said step portions lie in a separate plane, and said second connecting member having a channel type section with upwardly protruded portions at both edges thereof, a plurality of reinforcing support portions provided at a lower surface of a junction where each side wall is connected with said first and said second connecting members, said junction corresponding to a bent edge of said side wall, each of the reinforcing support portions being a lug protruded from the lower surface of the junction upon forming a recess at an upper surface of the junction;

a pair of axial pins each provided at a rear end of each side wall of said pivotable bracket and connected to said pair of support members of the fixed base plate, whereby the pivotable bracket is pivotable with respect to the fixed base plate; and a cassette holder mounted in the bracket and adapted to receive a tape cassette therein.

2. The apparatus according to claim 1, wherein each of the side walls of said pivotable bracket has a guide pin extending inwardly from an inner surface of the side wall and the cassette holder has a guide slot for receiving the guide pin, to mount the cassette holder in the bracket, so that when a slide base slidably mounted to the fixed base plate moves toward a head drum of the apparatus at a closed state of the cassette housing, the cassette holder and the tape cassette are guided to the head drum, by the guide pin and the guide slot.

3. The apparatus according to claim 1, wherein said pivotable bracket further comprises a plate spring mounted to a lower surface of one of the connecting members, said connecting member being disposed adjacent to a cassette insertion opening, said plate spring being adapted to urge the cassette holder toward a slide base slidably mounted to the fixed base plate.

* * * * *